Feb. 21, 1928.
J. J. NOETH ET AL
1,659,610
BREAD AND SANDWICH TOASTER
Filed July 7, 1926  3 Sheets-Sheet 1
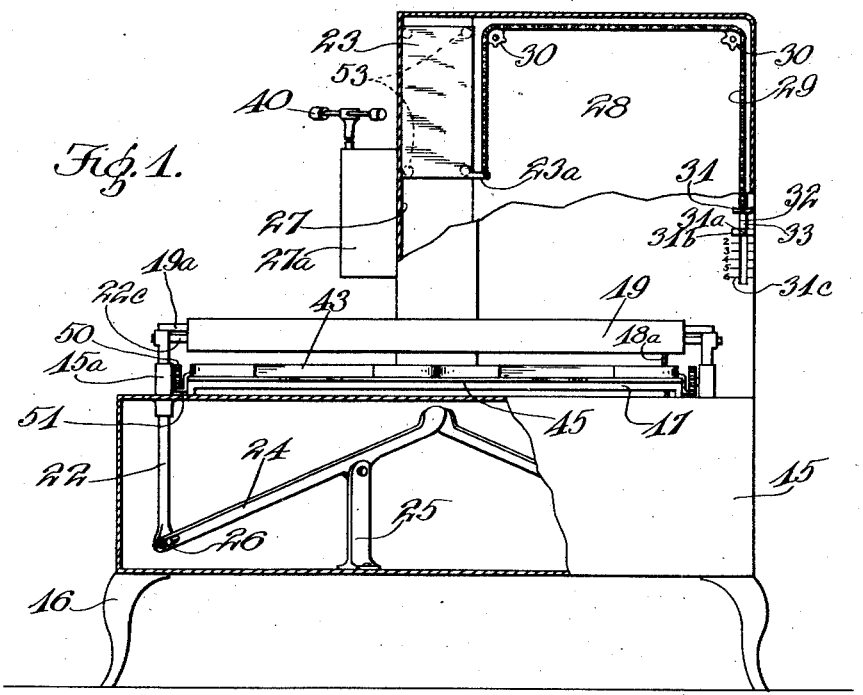
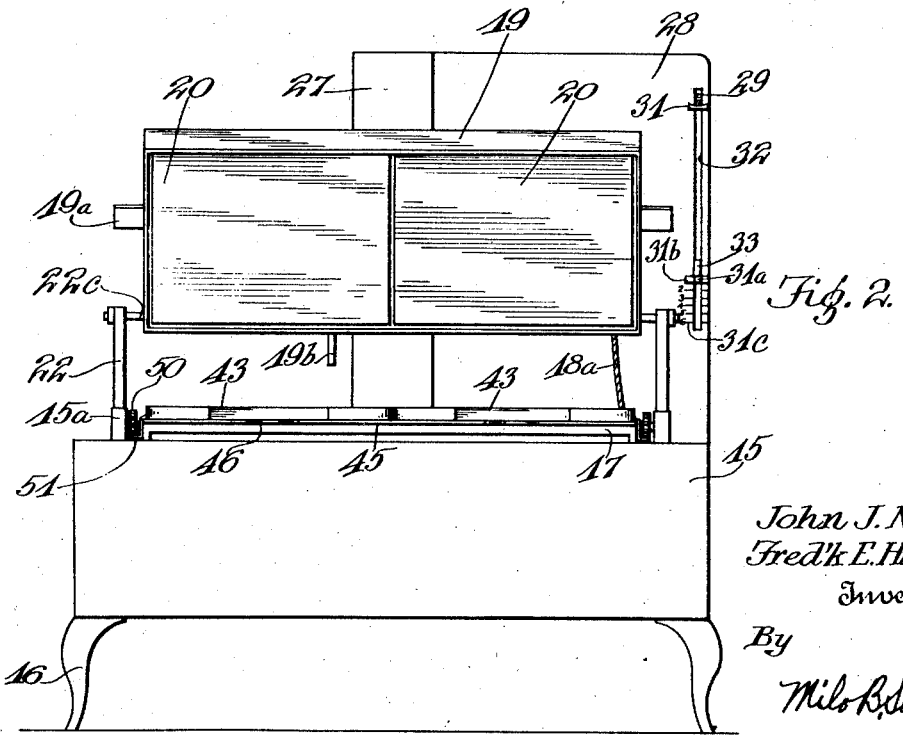
John J. Noeth
Fred'k E. Hummel
Inventors.
By Milo B. Stevens Co.
Attorneys.

Feb. 21, 1928.

J. J. NOETH ET AL 1,659,610

BREAD AND SANDWICH TOASTER

Filed July 7. 1926   3 Sheets-Sheet 2

John J. Noeth
Fred'k E. Hummel
Inventors.

By Milo B. Stevens Co.

Attorneys.

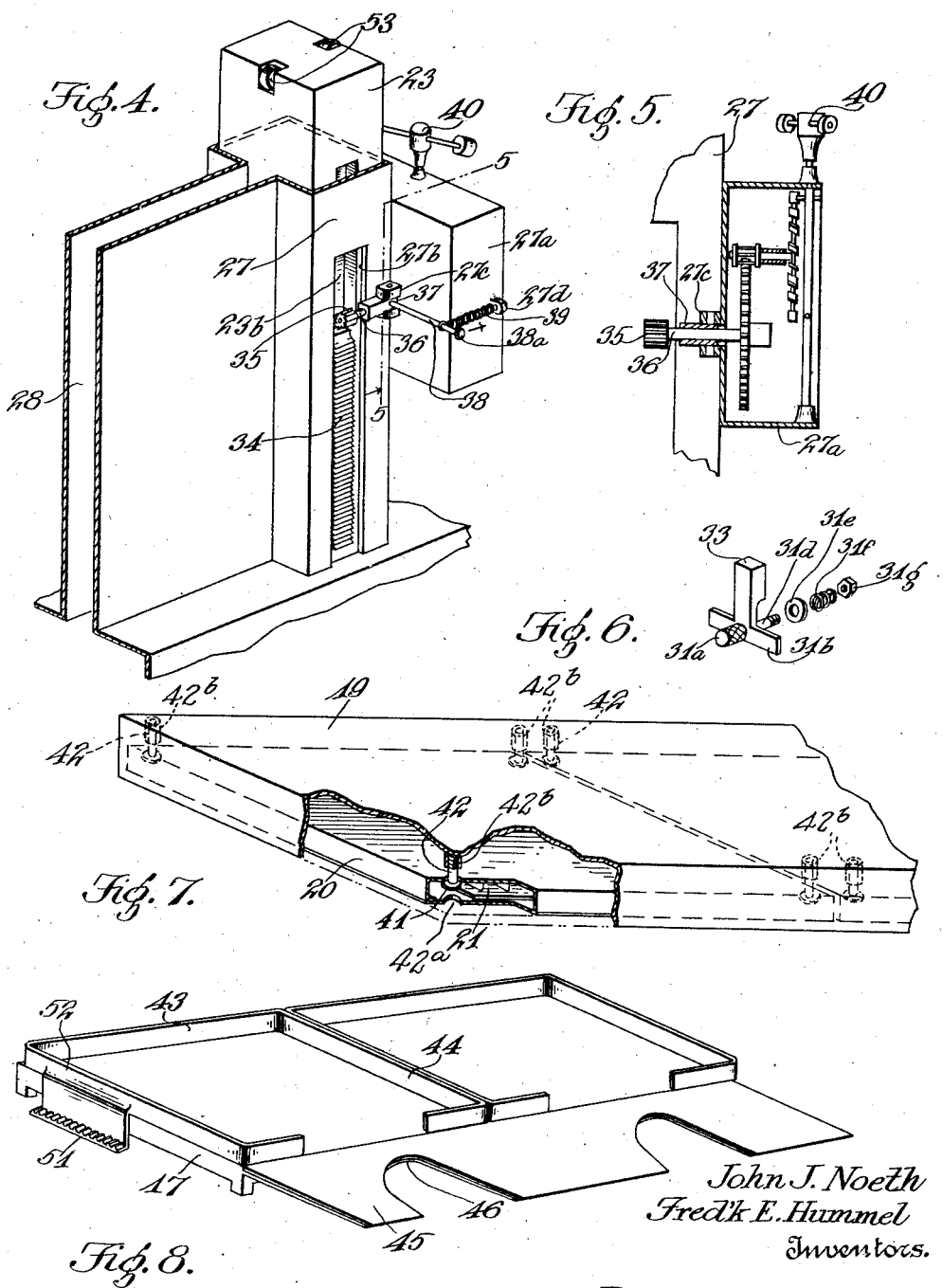

Patented Feb. 21, 1928.

1,659,610

UNITED STATES PATENT OFFICE.

JOHN J. NOETH AND FREDERICK E. HUMMEL, OF CHICAGO, ILLINOIS.

BREAD AND SANDWICH TOASTER.

Application filed July 7, 1926. Serial No. 120,959.

This invention relates to bread and sandwich toasters of the type commonly used in restaurants, lunch rooms and the like, and more particularly to that class of toasters which are electrically heated and automatically timed, our object being to produce a toaster of this kind which offers easy access to the operator for inserting or removing the contents.

A further object of our invention is to construct the novel toaster in such a manner that the heating elements thereof will be in a position remote from the path taken by the operator's hand when inserting or removing the contents, whereby to prevent the incurrence of discomfort or burns.

A still further object of the invention is to embody therein an element to receive or project the contents upon an external platform which is cool and handy to the operator.

Another object of the invention is to embody therein a heating element which closely conforms to the contents whether these are of regular or uneven formation, whereby to toast them uniformly.

A final but nevertheless important object of our invention is to construct the same on sturdy lines and of few and simple parts, whereby it may operate efficiently for long periods and sell at a reasonable figure.

With the above objects in view and any others which may suggest themselves from the specification and claims to follow, a better understanding of the invention may be gained by reference to the accompanying drawings, in which—

Figure 1 is an elevation of the novel toaster, partly broken away, as set for operation;

Fig. 2 is a similar view, the toaster being at the end of its operation;

Fig. 4 is a sectional perspective view of a timing mechanism;

Fig. 5 is an interior view of said timing mechanism, primarily taken on the section line 5—5 of Fig. 4;

Fig. 6 is a perspective detail of a timing control;

Fig. 7 is a perspective detail of a self-leveling heating element; and

Fig. 8 is a perspective view of the apparatus for receiving and dispensing the toaster contents.

Figure 3:
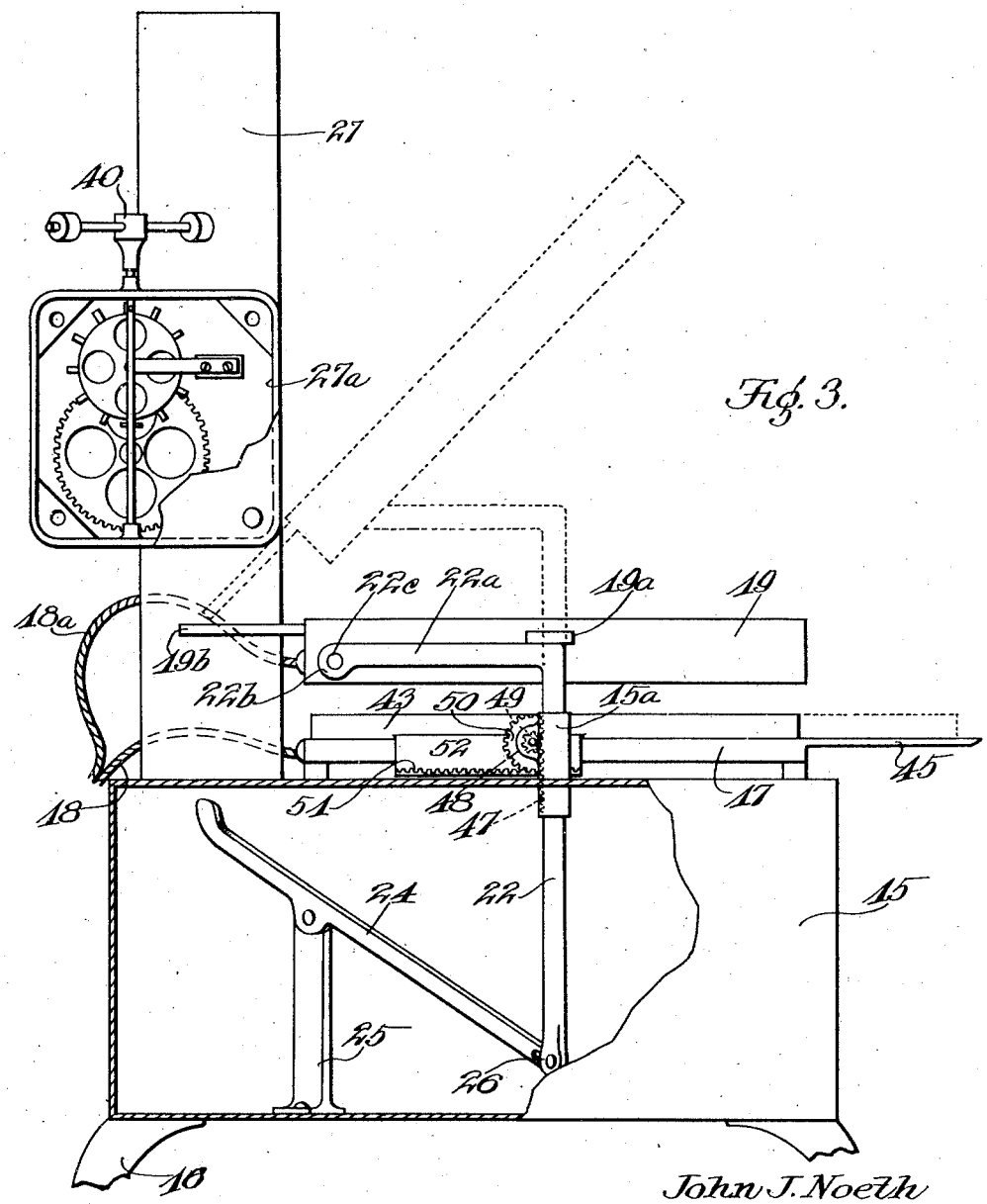
Fig. 3 is a side view, partly broken away.

Referring specifically to the drawings, 15 denotes the base of the appliance, which is in the form of a cabinet, and adapted to be supported on a table, counter or other suitable fixture by corner feet 16.

On the base 15 is erected a platform 17 of hollow sheet metal construction, whose interior contains an electrical heating unit (not shown) supplied by a current lead 18 at the rear. The platform therefore serves as a heat-plate on which the bread slices or sandwiches to be toasted may be laid for bottom-heat application. For top-heat application, a flat lid-plate 19 is arranged over the platform 17, such plate containing one or more rectangular box-like heat-plates 20 in lateral succession, corresponding to the number of bread slices or sandwiches intended to be accommodated by the platform. The present showing represents a machine having a capacity of two charges at a time. Like the lower heat-plate the upper ones—20—contain the necessary heating elements—indicated at 21 in Fig. 7—and receive current from leads 18$^a$.

The lid-plate 19 is supported by end-posts 22, on which rest lateral extension-lugs 19$^a$ of the plate, the posts being rearwardly extended at their upper ends with arms 22$^a$ to a point near the rear edge of the lid plate, where the arms 22$^a$ are formed into eyes 22$^b$ to receive trunnions 22$^c$ from the ends of the lid plate, whereby to hingedly support the same at the rear. The upper heat unit is therefore susceptible of being swung up, like the lid of a trunk, for access when a charge is to be deposited or removed from between the heat-plates.

The upper heat unit is also intended to be raised as a whole, as denoted by its position in Fig. 2, to provide a greater amount of room between the upper and lower heat units while a charge is being deposited or removed by the rise of the end-posts 22 through base bearings 15$^a$, as induced by a weight 23 bearing on the rear ends of a pair of rocker arms 24 fulcrumed in standards 25 and having their forward ends linked by pin-and-slot connections 26 to the lower ends of the end posts 22. The weight 23 is vertically slidable in a shaft 27 communicating with the base 15 at the rear; and the rocker arms 24 operate inside the base, the standards 25 being erected on the bottom of the latter.

The shaft 27 communicates with a side chamber 28 in which a chain 29 is adapted to travel. One end of the chain is attached to a bottom-lug 23ª of the weight, the medial portion of the chain passing over the idler sprockets 30, and the other end of the chain receives a finger lug 31 through a vertical slot 32 in the frontal wall of the chamber 28. The weight 23 may be raised by depressing the finger lug 31, the high position of the weight being indicated in Figure 1; and when the finger lug is released, the tendency of the weight will be to fall and accomplish the rise of the upper heat unit as previously described.

It will be noted that the chain chamber 28 is of such width as to locate the actuating element—finger lug 31—at the extreme end of the machine, in which position the hand or finger of the operator will amply clear of the path of the upper heat unit and therefore avoid discomfort or injury from possible contact therewith.

The swinging or opening motion of the upper heating unit is induced automatically by the rise thereof, the method being very simple. As noted particularly in Figure 3, the lid-plate 19 has a rearwardly projecting stem 19ᵇ alongside the shaft 27. The latter carries a timing mechanism (to be referred to later) in a casing 27ª at a point above the stem 19ᵇ. When the upper heating unit is raised by the end posts 22, it rests with the extension lugs 19ª upon the latter; however, when in the course of the ascent the projecting stem 19ᵇ meets the timer casing 27ª the latter serves as a stop or deterrent, and the further ascent of the assembly is consequently accompanied by the swinging or opening action anticipated. To smoothen the impact of the stem 19ᵇ with the bottom of the casing 27ª the corner of the latter is rounded as shown; and, of course, the remaining corners may also be rounded to harmonize. Also, to reduce friction, the point of impact may be fitted with one or more rollers, if desired. The impact will not be sudden or sharp, since it is our intention to so counterbalance the weight in the design of the upper heating unit that the latter will be raised slowly.

Since it is customary to time the toasting operation consistent with various degrees to which the charge is to be toasted we have adapted the automatic timing mechanism shown in our Patent No. 1,547,920, (Hummel and Noeth) of November 10, 1925, to the present appliance without material change. As before, the function of this mechanism is to permit the weight 23 to be raised to various degrees of a resistance through which it must descend before it falls. The length of time consumed by the descent is predetermined by the raising movement and represents the duration of the toasting operation, so that immediately as the weight falls it induces the opening of the upper heating unit.

In the present embodiment, the extent to which the weight is raised by the depression of the finger lug 31 is determined by a stop lug 33 movable in the slot 32 by means of a finger pin 31ª projecting from the lug; the latter also has a cross bar 31ᵇ on the outside of the slot cooperating with a scale of graduations 31ᶜ representing minutes on the face of the chain chamber wall. The stop lug 33 is intended to be set at any desired point in the scale and may be held there by the holding means of Fig. 6 (shown separated) or by any other suitable means. In the illustration, 31ᵈ represents a screw extension of the lug through the slot, 31ᵉ a loose washer, 31ᶠ an expanding spring, and 31ᵍ a nut. The assembly of these parts with the wall between the cross bar 31ᵇ and the washer 31ᵉ will exert sufficient force to hold the stop lug where set.

In raising the weight to the predetermined "set" position above outlined, a ratchet-tooth rack bar 34 lodged in a cavity 23ᵇ in the weight slips along a ratchet-tooth pinion 35, which has access to the rack by way of a slot 27ᵇ of the shaft 27. The pinion 35 is carried by a spindle 36 journaled in a block 37, which is pivoted in bearings 27ᶜ carried by the timer casing 27ª. The block 37 has a projecting arm 38 which is urged by an expanding spring 39 to cause the pinion 35 to bear against the rack bar 34. The working end of the spring 39 is attached to the arm 38, while the stationary end is attached to a lug 27ᵈ of the casing 27ª.

While the weight 23 imparts no motion to the pinion 35 on the up-stroke, its return or descent—as the finger lug 31 is released—causes the engagement of the ratchet teeth on the rack bar 34 and the pinion 35, whereby the latter is rotated. The motion of the pinion is transmitted to the timer gearing in the case 27ª, whose speed is controlled by a final govenor element 40, so that the descent of the weight is limited to the predetermined rate. When the weight has descended sufficiently to move its rack bar free of the pinion, it will fall freely and accomplish the result outlined. Obviously, the higher the weight is raised manually, the longer it will take to descend, extending the toasting process accordingly.

In the slicing of bread, cheese and like foods, the cut is frequently slanted, making the slice more or less wedge-shaped. If both faces of the slice—or similarly affected sandwich—are to be evenly toasted, both heat plates applicable thereto should fully cover the faces of the charge. In the present embodiment, the upper heat plates 20 are independently free within the lid-plate 19 to conform to the inclination of the charge as the upper heat unit closes thereon. As indicated in Fig. 7, each of the rectangular box-like heat plates 20 is loosely hung at the corners upon the heads 41 of inverted screws or pins 42 carried by the bushings 42ᵇ at the under surface of the lid-plate 19. Screw heads 41 are accessible through holes 42ᵃ in the bottom of the box-like heat plates 20. When, upon the descent of the upper heating unit, a given heat plate 20 settles on an uneven charge, the heat plate is free to assume the form of the charge as the unit closes.

In restaurant use, especially during meal hours, the toaster will be heated continuously, so that time will not be lost while the heat plates are themselves receiving heat each time the current is turned on. With the heating units constantly hot, the insertion and removal of the food charges may, when the operator is rushed or unhandy, expose his hands to the danger of a burn. To eliminate this danger, we have provided an automatic charge slider to position the charge more remotely from the heat plates and handier to the operator.

Referring more particularly to Figures 3 and 8, the slider referred to is denoted by 43 and comprises a low metal frame positioned on the heat plate 17 and divided laterally by one or more partitions 44, according to the number of charges which are receivable on the heat plate. The divisions of the slider are substantially rectangular in conformity with the usual outline of the charge, and are cut away at a medial frontal point. The slider is intended to move forwardly on the heat plate when the toaster opens, so that the charge in the slider will be carried onto an extension 45 of the heat plate for handy removal by the operator; and, when a new charge has been deposited on the extension within the slider, the closing of the toaster is intended to draw the slider and its charge rearwardly. To facilitate the removal and insertion of the charge, the extension 45 may be surfaced with or entirely built of a material having a low coefficient of heat, so as to be harmless when touched by the hand; also, the extension may be cut out, as indicated at 46, at the front to permit the thumb and forefingers to be handily applied when to lift a dispensed charge over the slider.

The operation of the slider may be induced by any suitable motive connection with the upper heating unit of the toaster, but it is our present preference to use the end posts 22 as the prime mover. Each of these, where it travels in its bearing 15ᵃ, is cut with a gear rack 47; and the bearing is extended at 48 to house a pinion 49 in mesh with the said gear rack. The pinion has its spindle extended to carry an outer gear 50 which meshes at the bottom with a gear rack 51 formed in a drop flange 52 depending from each end piece of the slider 43. It will be obvious that the rise of the end posts 22 will effect the forward projection of the slider, and vice versa. Finely dotted lines show the change in position of the principal movable parts.

Our object in attaching the chain 29 to the bottom of the weight is to save the additional vertical space the installation would require if the attachment were applied at the top of the weight. To relieve possible lateral binding tendency on the part of the weight during its upward travel within its shaft, rollers 53 may be fitted to the upper and lower ends of the weight as shown in Figs. 1 and 4.

The appliance may also be made in a model for occasional or home use, in which case an electric switch—automatically operated by the opening and closing actions of the toaster, by a suitable connection—could be provided to turn on the current when the toaster is put into use, and turn it off when the toasting operation has been completed, saving current, and the special attention of the operator in that connection. In such a model, the timing would obviously require extension to allow for the initial heating of the appliance.

An appliance is thus had which is simple and capable of giving rapid service. Its principle is adaptable to various kindred uses, such as for the baking of waffles, frying of pan cakes, etc., wherein but ordinary skill in the art is required to design the heating units to suit. The appliance itself is also susceptible to various changes and refinements in the progress of its manufacture which would not require inventive skill, and we desire such changes and refinements to be considered as coming within the scope and spirit of the appended claims.

It may be added that in case a mistake has been made in charging or setting the toaster, it may be caused to open at once by drawing a terminal knob 38ᵃ of the arm 38 in the direction of the arrow indicated in Fig. 5, in which event the pinion 35 will depart from its contact with the weight rack 34, and permit the weight to fall prematurely.

We claim:—

1. A bread-slice toaster comprising a horizontal heat plate on which the slice is laid, a companion heat plate deposited upon the slice and means to horizontally lift and subsequently swing the latter heat plate away from the slice to expose the latter for removal.

2. A bread-slice toaster comprising a horizontal heat plate on which the slice is laid, a companion heat plate above the slice, manual means operable to depress the companion heat plate upon the slice, means to horizontally raise the said companion heat plate off the slice, and means cooperating with said last mentioned means to cause said companion heat plate to swing away from the slice during the course of its ascent.

3. A toaster for bread slices and the like comprising a heating element on which the slice is laid, a frame above the slice and adapted to close upon the same, and a heating element loosely suspended from said frame to seat upon and conform to the upper face of the bread slice independently of the closing movement of the frame.

4. A toaster for bread slices and the like comprising a heating element on which the slice is laid, a frame above the slice and adapted to close upon the same, and a heating element loosely suspended at distantly-spaced points in its expanse from said frame to seat upon and conform to the upper face of the bread slice independently of the closing movement of the frame.

5. A bread-slice toaster comprising a heating element on which the slice is laid, a companion heating element adapted to close upon the slice to toast the same and open when the toasting is completed, and a frame about the slice and slidable on the first named heating element to move the slice inwardly when to be toasted and outwardly when finished.

6. A bread-slice toaster comprising a heating element on which the slice is laid, a companion heating element adapted to close upon the slice to toast the same and open when the toasting is completed, a frame about the slice and slidable on the first named heating element, and a connection between the said companion heating element and the frame whereby the latter will be automatically actuated to move the slice inwardly when the said companion heating element closes and outwardly when it opens.

7. A bread slice toaster comprising a heating unit for supporting a slice, a companion heating unit movably mounted to engage the opposite side of said slice, means operable to actuate said last mentioned heating unit bodily away from said first named heating unit and in a plane parallel thereto, and means cooperating with said second named heating unit in its aforementioned movement for swinging the same to a position out of alinement with said first named heating unit to thereby expose the slice for removal.

8. A bread slice toaster comprising a heating unit for supporting a slice, a companion heating unit movably mounted to engage the opposite side of said slice, and means operable to actuate said last mentioned heating unit bodily away from said first named heating unit and in a plane parallel thereto, and subsequently to position said second mentioned heating unit out of alinement with said first named heating unit to thereby expose the slice for removal.

9. A bread slice toaster comprising a heating unit for supporting a slice, a companion heating unit, a member movable in a plane at right angles to the plane of said first heating unit and upon which said companion heating unit is pivotally mounted and normally supported in a plane parallel with the first heating unit, means for actuating said member to simultaneously disengage the entire active surface of said second heating unit from the slice, and subsequently acting means for swinging the second heating unit out of alinement with the first heating unit to expose the slice for removal.

10. A bread slice toaster comprising a heating unit for supporting a slice, a companion heating unit, a member movable in a plane at right angles to the plane of said first heating unit and upon which said companion heating unit is pivotally mounted and normally supported in a plane parallel with the first heating unit, means for actuating said member to simultaneously disengage the entire active surface of said second heating unit from the slice, and cooperating abutments associated with said toaster and the second heating unit, said abutments engaging after a predetermined movement of said member to swing said second heating unit to a position out of alinement with said first heating unit to thereby expose the slice for removal.

11. A bread slice toaster comprising a base, a pair of heating units, one of said units being secured to said base, a member movable in a plane at right angles to the plane of said first mentioned heating unit and upon which the second heating unit is pivotally mounted and normally supported in a plane parallel with the first heating unit, one of said heating units being designed to support a slice, means for actuating said member to move said second mentioned heating unit away from the first mentioned unit, and subsequently acting means for swinging the second heating unit out of alinement with the first heating unit to expose the slice for removal.

12. A bread slice toaster comprising a base, a heating unit supported upon said base, a supporting member mounted for sliding movement transversely of the plane of said aforementioned heating unit, a second heating unit pivotally supported upon said supporting member and normally disposed in a plane parallel with the plane of said first mentioned heating unit and in opposed relationship thereto, one of said heating units being designed to support a slice operating means for said supporting member to move said second mentioned heating unit away from the first mentioned heating unit and in alined parallelism therewith, and means operable in the above mentioned movement of said supporting member for swinging said second mentioned heating unit out of alinement with said first mentioned heating unit to thereby permit removal of the slice from the heating unit upon which it is disposed.

13. A bread slice toaster comprising a base, a heating unit supported upon said base, a supporting member mounted for sliding movement transversely of the plane of said aforementioned heating unit, a second heating unit pivotally supported upon said supporting member and normally disposed in a plane parallel with the plane of said first mentioned heating unit and in opposed relationship thereto, said base-carried heating unit being designed to support a slice, operating means for said supporting member to move said second mentioned heating unit away from the first mentioned heating unit and in alined parallelism therewith, means operable in the above mentioned movement of said supporting member for swinging said second mentioned heating unit out of alinement with said first mentioned heating unit to thereby permit removal of the slice from the heating unit upon which it is disposed, a frame slidable upon said base carried heating unit and within which the slice is located, said base having an extension in a plane with said base-carried heating unit, and gearing associated with said slidable frame and supporting member for actuating said supporting frame to slide outwardly onto said extension when the supporting member moves to elevate said second mentioned heating unit.

14. A bread slice toaster comprising a base, a heating unit supported upon said base, a supporting member mounted for sliding movement transversely of the plane of said aforementioned heating unit, a second heating unit pivotally supported upon said supporting member and normally disposed in a plane parallel with the plane of said first mentioned heating unit and in opposed relationship thereto, said base-carried heating unit being designed to support a slice, operating means for said supporting member to move said second mentioned heating unit away from the first mentioned heating unit and in alined parallelism therewith, means operable in the above mentioned movement of said supporting member for swinging said second mentioned heating unit out of alinement with said first mentioned heating unit to thereby permit removal of the slice from the heating unit upon which it is disposed, a frame slidable upon said base-carried heating unit and within which the slice is located, and gearing associated with said slidable frame and supporting member for actuating said supporting frame to slide outwardly when the supporting member moves to elevate said second mentioned heating unit.

15. A bread slice toaster comprising a heating unit for supporting a slice, a movable frame designed to close upon said heating unit, a second heating unit loosely suspended from said frame and designed to seat upon and conform to the upper face of the slice independently of the closing movement of said frame, means operable to actuate said frame bodily away from said first named heating unit and in a plane parallel thereto, and means cooperating with said frame in its aforementioned movement for actuating the same to a position out of alinement with said first named heating unit to thereby expose the slice for removal.

16. A bread slice toaster comprising a heating unit for supporting a slice, a movable frame designed to close upon said heating unit, a second heating unit loosely suspended from said frame and designed to seat upon and conform to the upper face of the slice independently of the closing movement of said frame, means operable to actuate said frame bodily away from said first named heating unit and in a plane parallel thereto, means cooperating with said frame in its aforementioned movement for actuating the same to a position out of alinement with said first named heating unit to thereby expose the slice for removal, a slide frame upon said first mentioned heating unit and confining the slice therein, and means operable by the movement of said movable frame away from said first named heating unit for actuating said slidable frame outwardly to project beyond one edge of said first heating unit and inwardly when the movable frame is moved toward said first named heating unit.

17. A bread slice toaster comprising a heating element on which the slice is laid, a companion heating element adapted to close upon the slice to toast the same and open when the toasting is completed, a frame about the slice and slidable on the first named heating element, an actuating arm for operating said companion heating element and having rack teeth at one edge, a guide through which said arm works, a gear journalled to said guide and engaging the rack teeth of said arm, a rack toothed flange at one side of said frame, and a second gear fixed on the same center as said first gear and engaging the rack toothed flange of said frame whereby the latter will be automatically actuated to move the slice inwardly when the said companion heating element closes and outwardly when it opens.

18. A bread slice toaster comprising a heating element on which the slice is laid, a companion heating element adapted to close upon the slice to toast the same and open when the toasting is completed, a frame about the slice and slidable on the first named heating element, an actuating arm for operating said companion heating element and having rack teeth at one edge, a rack formed upon said frame and gearing operatively connecting the racks of said arm and frame whereby the latter will be automatically actuated to move the slice inwardly when the said companion heating element closes and outwardly when it opens.

19. In a toaster or the like including a heating element for supporting a slice, a slice confining frame slidable upon said heating unit to project beyond one edge thereof, a lever having rack teeth, a rack formed on said frame, and gearing for operatively connecting said racks whereby to control the position of said frame through the operation of said lever.

20. In a bread slice toaster comprising a heating element for supporting a slice and a companion heating element movable to a position above the slice whereby to toast both sides therof a slice confining frame slidable upon said first heating element, an operating lever for controlling the movement of said companion heating element, and an operative connection between said operating lever and said slidable slice confining frame for actuating the latter inwardly as the companion heating element moves to toasting position and outwardly as the companion moves to inoperative position.

In testimony whereof we affix our signatures.

JOHN J. NOETH.
FREDERICK E. HUMMEL.